(No Model.) 8 Sheets—Sheet 4.
J. W. DARLEY, Jr.
ELECTRIC RAILWAY.
No. 590,882. Patented Sept. 28, 1897.
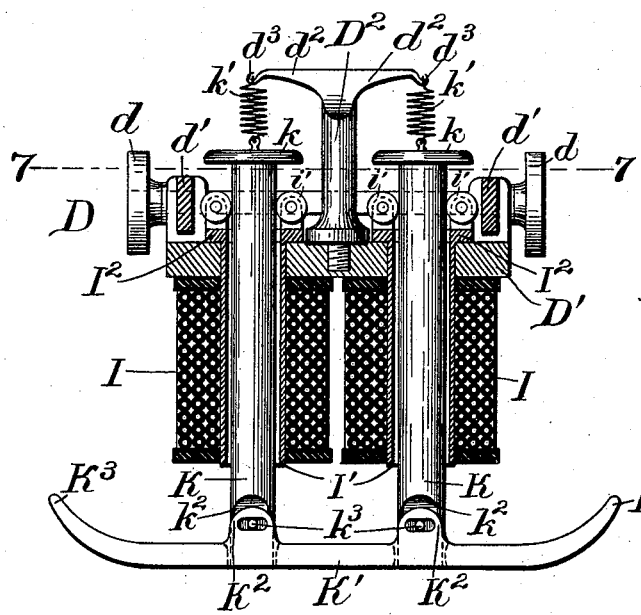
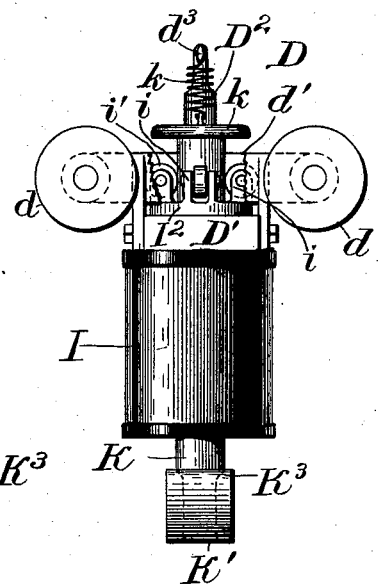
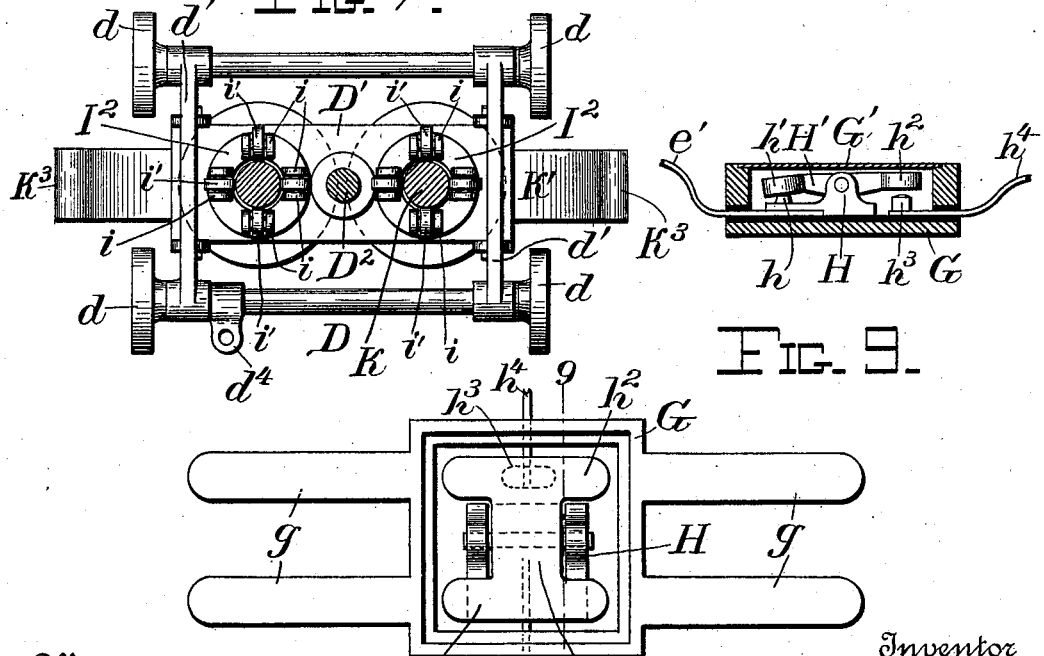
Witnesses
Percy C. Bowen
J. Stephen Ginsta
Inventor
J. W. Darley, Jr.,
By Whitman & Wilkinson,
Attorneys.

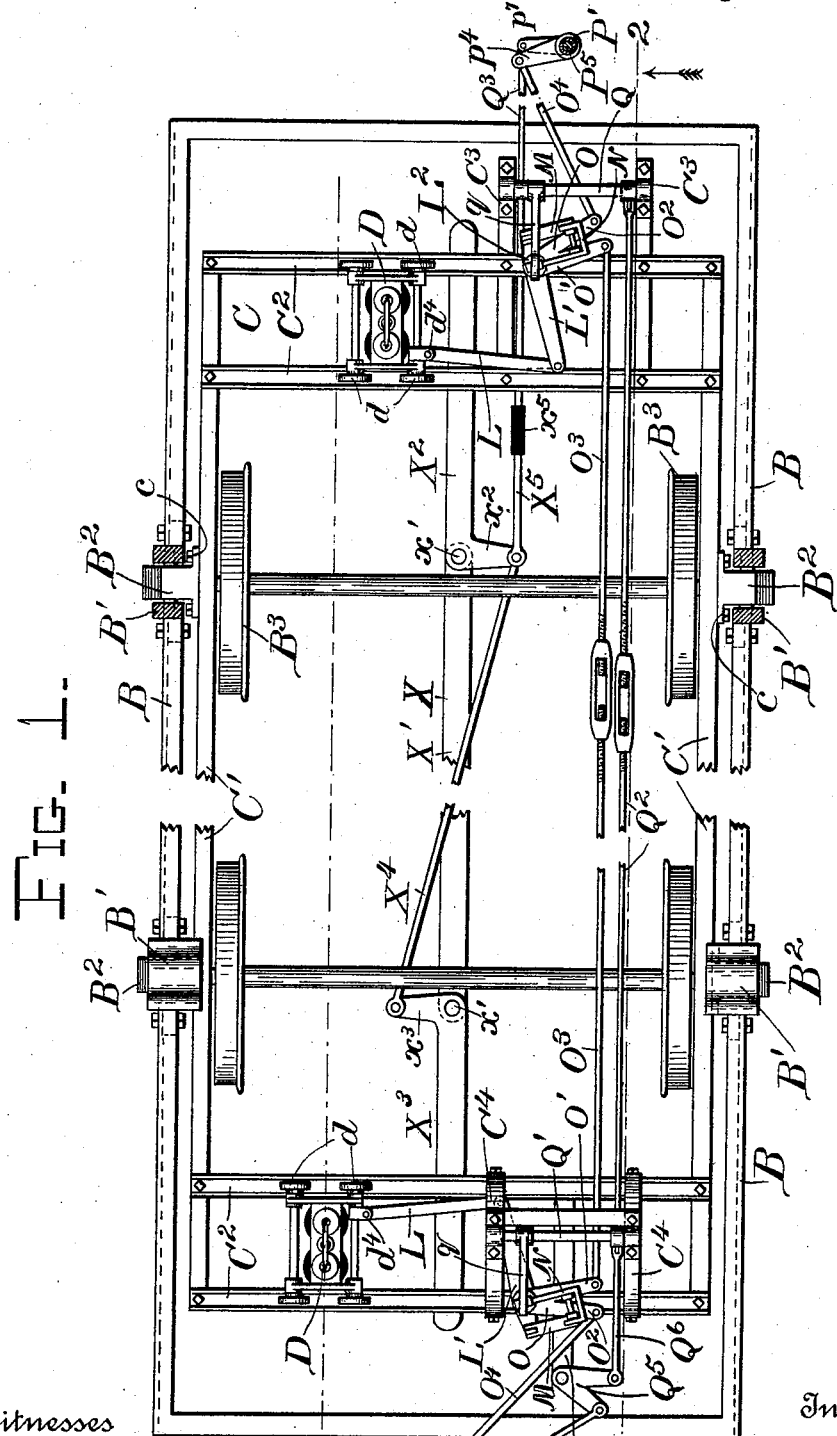

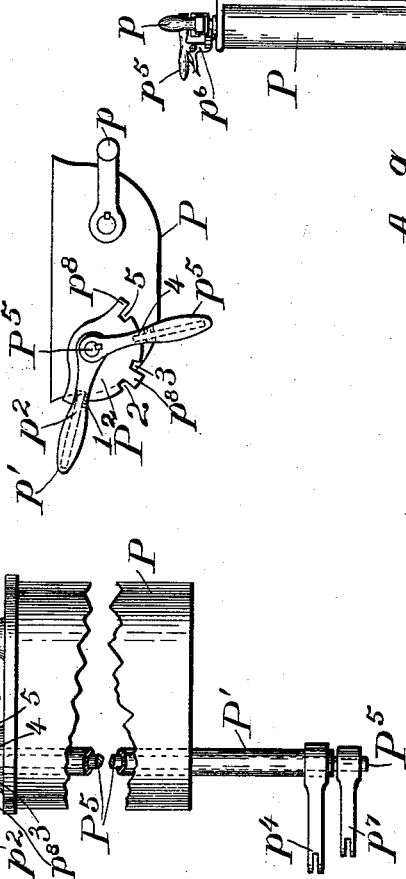
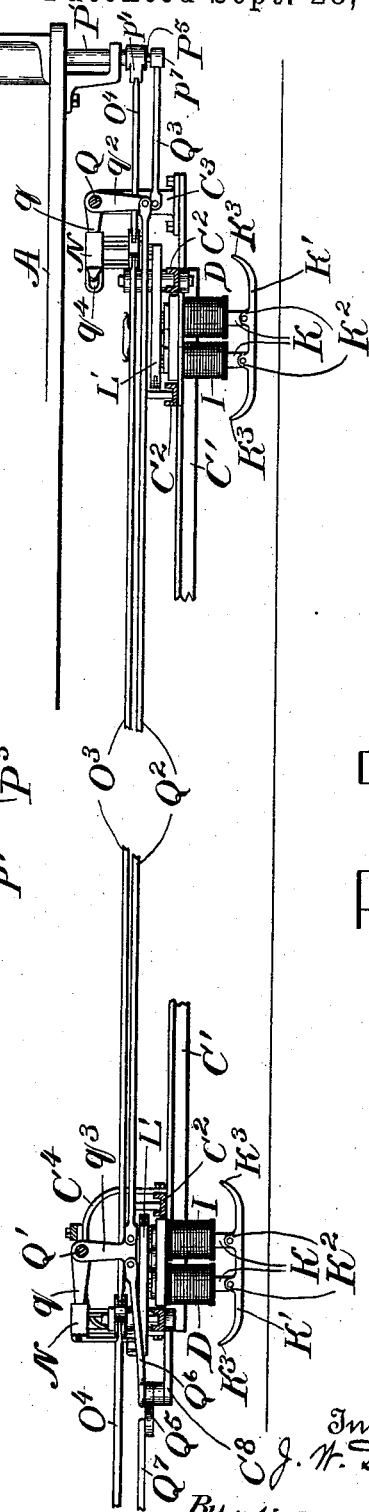

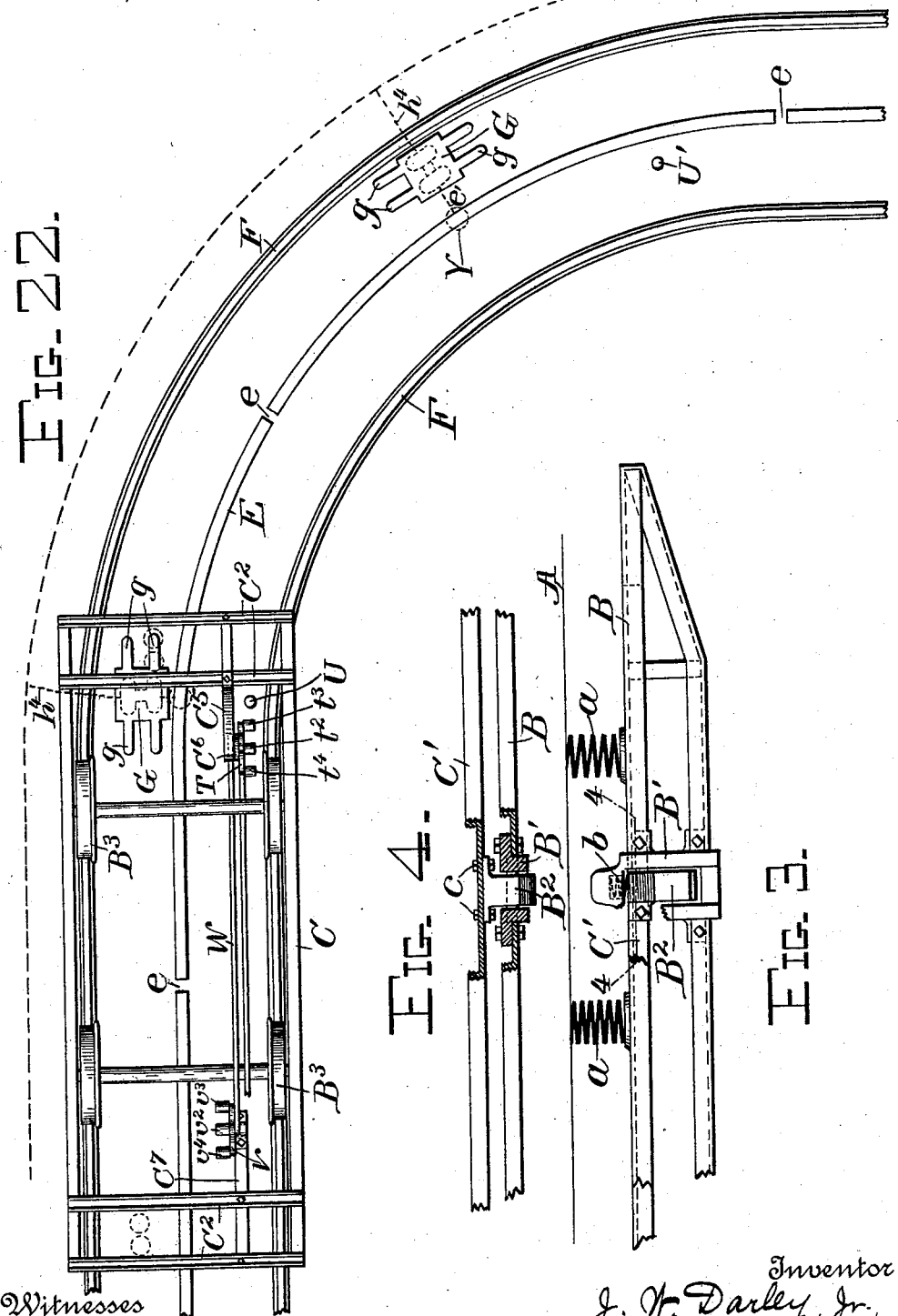

(No Model.) 8 Sheets—Sheet 5.
J. W. DARLEY, Jr.
ELECTRIC RAILWAY.
No. 590,882. Patented Sept. 28, 1897.
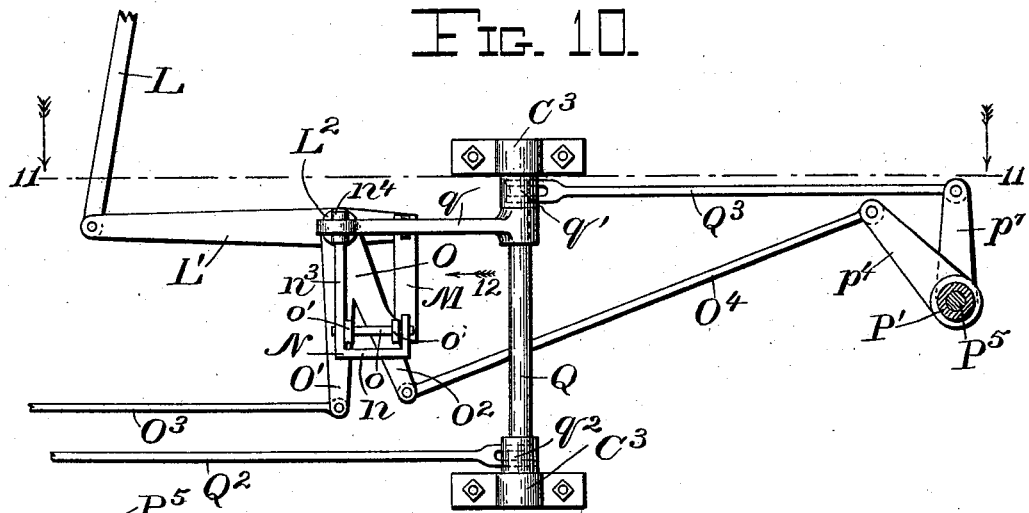
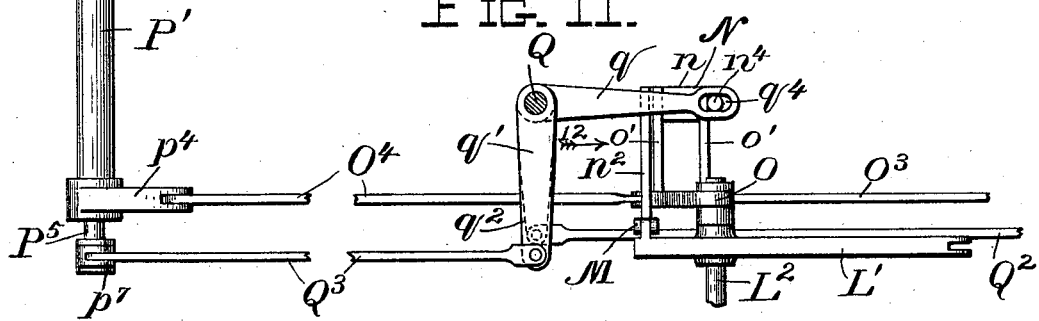
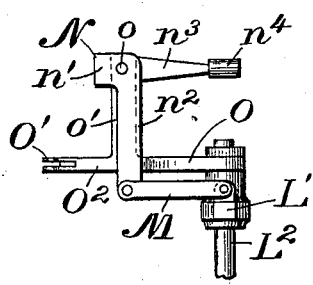
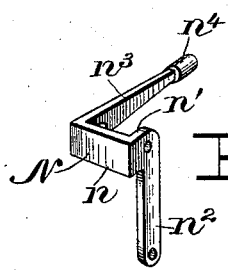

(No Model.)
J. W. DARLEY, Jr.
ELECTRIC RAILWAY.
No. 590,882.
8 Sheets—Sheet 6.
Patented Sept. 28, 1897.
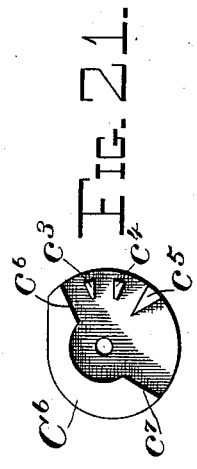
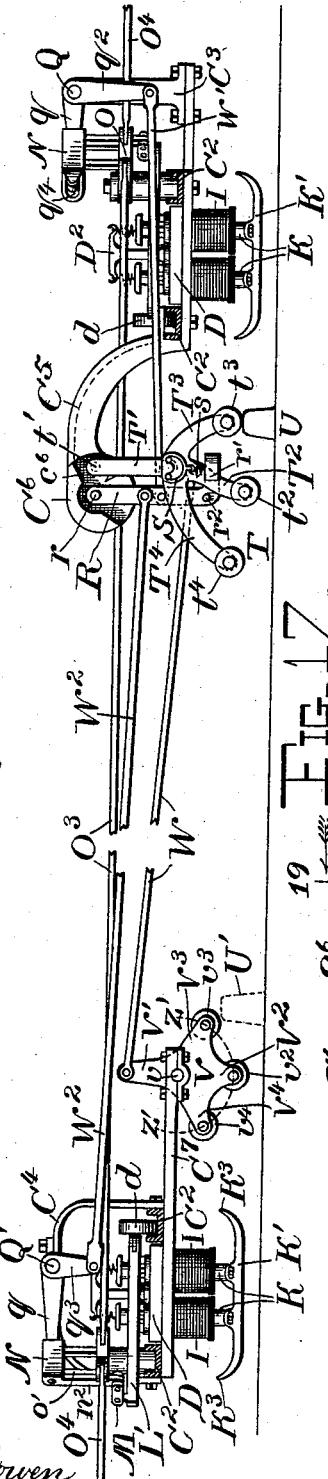
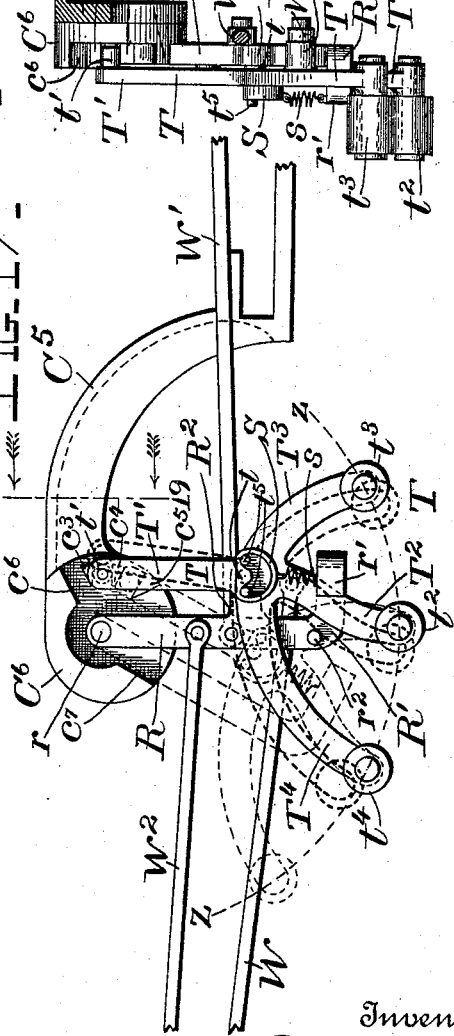
Witnesses
Percy C. Bowen
J. Stephen Ginsta
Inventor
J. W. Darley, Jr.,
by Whitman & Wilkinson,
Attorneys

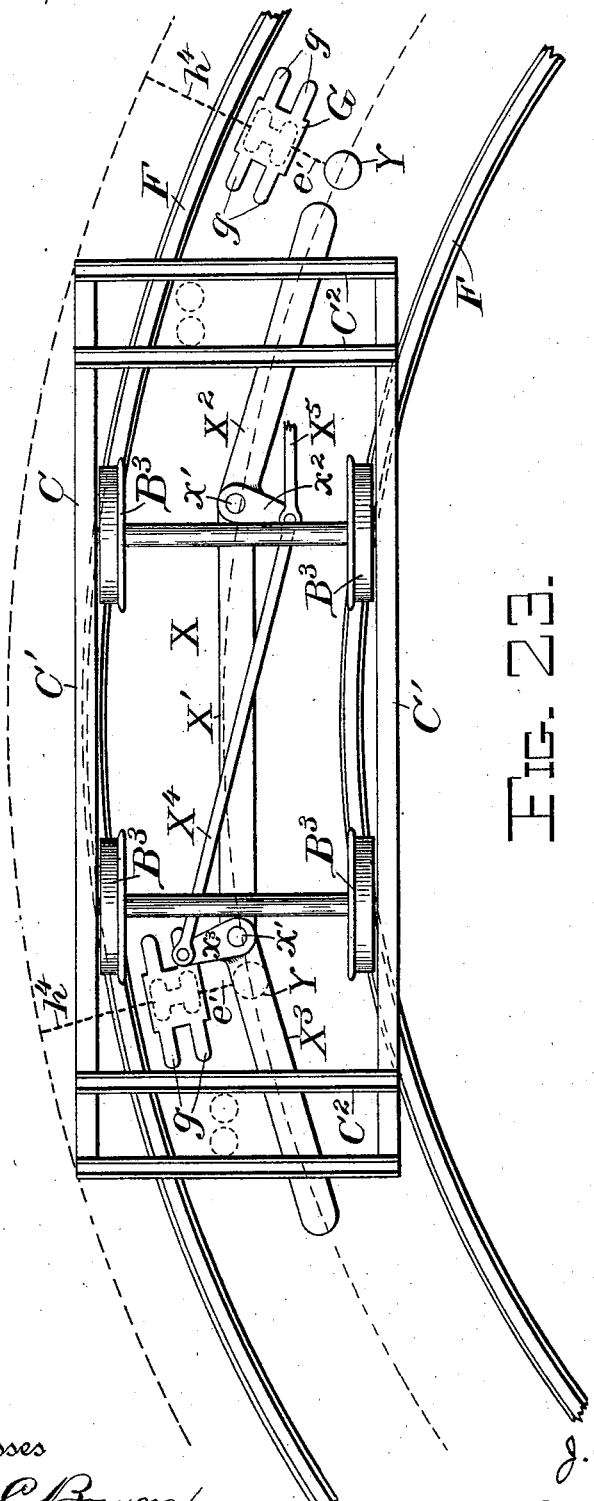

(No Model.) J. W. DARLEY, Jr. 8 Sheets—Sheet 8.
ELECTRIC RAILWAY.
No. 590,882. Patented Sept. 28, 1897.
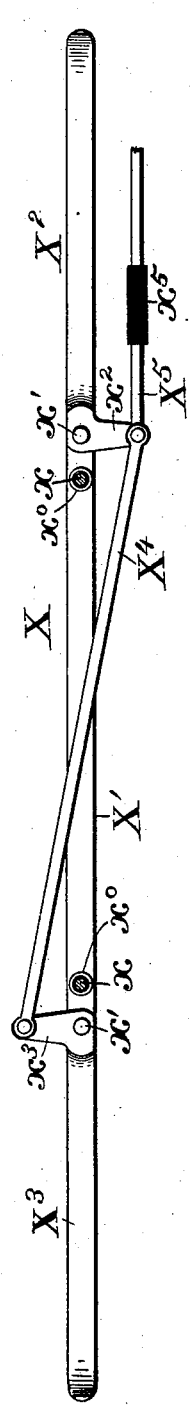
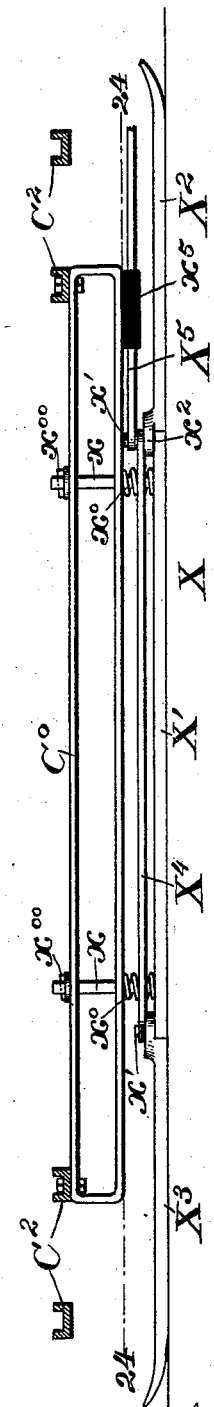

UNITED STATES PATENT OFFICE.

JOHN W. DARLEY, JR., OF BALTIMORE, MARYLAND, ASSIGNOR OF ONE-HALF TO MICHAEL HOLZMAN, PHILIP HAMBURGER, AND LEON HAMBURGER, OF SAME PLACE.

ELECTRIC RAILWAY.

SPECIFICATION forming part of Letters Patent No. 590,882, dated September 28, 1897.

Application filed August 1, 1896. Serial No. 601,404. (No model.)

*To all whom it may concern:*

Be it known that I, JOHN WESLEY DARLEY, Jr., a citizen of the United States, residing at Baltimore city, in the State of Maryland, have invented certain new and useful Improvements in Electric Railways; and I do hereby declare the following to be a full, clear, and exact description of the invention, such as will enable others skilled in the art to which it appertains to make and use the same.

My present invention relates to improvements in electric railways, and, while it is adapted, with or without modifications, to various forms of electric-railway systems, it is especially intended for railway systems of that class in which an interrupted conducting-rail is used and which have controlling-magnets carried by the truck to operate armatures placed along the track, the said armatures operating switches or other means for completing or for breaking the circuit in the conducting-rail, or in those systems that have a long conducting-shoe or a plurality of such shoes carried by the truck.

The object of my invention is to cause the controlling-magnet to preserve the same relation to the armature-boxes placed along the track and so operate the switches or collecting devices with approximately the same degree of accuracy and reliability on curved portions of the track as on straight portions of the track.

The said invention also consists of certain novel features of construction and in certain novel combinations and arrangements of parts, that will be hereinafter described.

Reference is had to the accompanying drawings, in which the same parts are indicated by the same letters and figures of reference throughout the several views.

Figure 1 represents a plan view of a car-truck fitted with my improved apparatus, the car-body having been removed and parts being broken away. Fig. 2 represents a longitudinal sectional view taken on the line 2 2 of Fig. 1, showing only the magnets and their immediate supports and connections. Fig. 3 represents a side elevation of a part of the truck, showing the method of attaching the magnet-frame to the journal-box and of supporting the car-truck upon the journal-box. Fig. 4 represents a horizontal sectional view of the same, taken on the line 4 4 of Fig. 3. Fig. 5 represents a longitudinal sectional view through the magnet-carriage and the helices of the magnets. Fig. 6 represents an end elevation of the magnet-carriage and magnets. Fig. 7 represents a horizontal sectional view of the same, taken on the line 7 7 of Fig. 5 and looking down. Fig. 8 represents a plan view of the armature-box with the top removed, showing the armatures therein. Fig. 9 represents a sectional view of the same, taken on the line 9 9 of Fig. 8 and looking to the left, the armature being shown in elevation. Fig. 10 is a plan view, on an enlarged scale, of a portion of the system of levers for moving the magnets transversely relative to the axis of the car. Fig. 11 represents a sectional view of the same, taken on the line 11 11 of Fig. 10, looking in the direction of the arrows. Fig. 12 is a detail view of certain parts of the system of levers shown in Figs. 10 and 11, looking in the direction of the arrow 12 in Fig. 11. Fig. 13 is a detail perspective view of one of the operating-levers. Fig. 14 is an elevation of the upper and lower ends of the controller-case, showing the levers for controlling the movements of the magnets. Fig. 15 is a plan view of the same. Fig. 16 is a similar view, partly in section. Fig. 17 represents a longitudinal sectional view of a truck similar to Fig. 2, showing other means for moving the magnets transversely relative to the axis of the car. Fig. 18 is a detail side elevation, on an enlarged scale, of a part of the system of levers shown in Fig. 17 for controlling the movement of the magnets. Fig. 19 is an end elevation of the same, the bracket being cut off on the line 19 19 of Fig. 18. Fig. 20 is an elevation of the two levers shown in Fig. 18, but looking from the opposite side. Fig. 21 is a detail view showing a side elevation of the locking-disk for the levers shown in Fig. 18. Fig. 22 is a diagram showing the arrangement of the several devices shown in Figs. 17 to 20 for operating the magnets when the car goes around a curve in the track. Fig. 23 is a plan view showing the operation of the flexible collecting-shoe. Fig. 24 is a plan view of the collecting-shoe, showing the supports in horizontal section, taken on the line 24 24 of Fig. 25; and Fig. 25 is a side elevation of the collecting-shoe and the flexible supporting devices for the same.

The motor used for propelling the car is omitted in order to avoid unnecessary complexity in the drawings, almost any of the well-known forms being adapted for use in connection with my invention.

A designates the platform of the car, which is supported upon the truck in any ordinary way, with springs $a$ interposed between the truck and car.

The truck B is provided with frames or boxes B', which inclose the journal-boxes B², as shown in Fig. 3, and have stiff springs or cushions $b$, which rest upon the journal-boxes and support the truck, thus taking up the minor vibrations before they are imparted to the truck. The axles of the wheels B³ are mounted in the journal-boxes in the usual manner.

Within the truck-frame and parallel thereto is arranged the magnet-frame C, the sides C' of which are bolted to the journal-boxes B², as at $c$. Each end of the frame C is formed of two parallel channel-irons C², forming tracks for the wheels $d$ of the magnet-carriages D. These magnet-carriages D, one at each end of the car-truck, are adapted to move in the tracks C² in a transverse direction relative to the axis of the car-truck. The means for moving the said carriages and for holding them in their proper positions will be hereinafter described.

The conducting-rail E is formed in sections insulated from each other, as at $e$, and is placed parallel with the track-rails F, either in the center of the track or at one side, as may be desired. Between the track-rails F, at one side of the center of the track, are placed at regular intervals the armature-boxes G. These boxes are made of iron and have extensions $g$ projecting longitudinally along the track for a short distance each way, the purpose of which will be hereinafter explained.

Within the armature-box G, but insulated therefrom, is secured a bracket H, having a stop $h$, and pivoted at its center in the said bracket H is an armature H', having symmetrical ends $h'$ and $h^2$, one of which, as $h'$, is limited in its downward motion by the stop $h$, while the other end, $h^2$, is adapted to make contact with the conducting-stud $h^3$, also insulated from the box. These armature-boxes G are provided with diamagnetic covers G', made sufficiently strong to form part of the road-bed.

The bracket H in the box G is connected by the wire $e'$ with the conducting-rail E, and the conducting-stud $h^3$ is connected by the wire $h^4$ with any suitable feeder from a source of electricity.

From the foregoing it will be understood that should one of the magnets on the car attract the end $h'$ of the armature the opposite end $h^2$ would be brought into contact with the conducting-stud $h^3$ and close the circuit from the feeder through the wire $h^4$, stud $h^3$, armature H', bracket H, and wire $e'$ to the conducting-rail E. If, however, the magnet on the car attract the opposite end $h^2$ of the armature, the circuit will be broken. Thus it will be seen that by having the armatures arranged along the track in such position that the magnets on the front end of the car will pass over the ends $h'$ of the armatures and the magnets on the rear end of the car will pass over the ends $h^2$ of the armatures the circuit will be closed to each section of the conducting-rail as the car passes over such section and will be opened or broken as the car leaves the section, and the collecting devices carried by the car can take electricity from the closed section of the conducting-rail as the car passes over it.

The frame of the magnet-carriage D comprises the iron plate or yoke-piece D', which serves also as the yoke-piece for the magnet, and the cross-pieces $d'$, of diamagnetic material, secured to the plate D', in which cross-pieces the rollers $d$ are journaled.

The helices I are secured at their upper ends to the yoke-piece D', from which they depend, and are wound upon tubes or sleeves I', of magnetic material, which latter extend through the yoke-piece D' and are secured therein. A ring I², of diamagnetic material, is secured upon the yoke-piece D' around the opening in the upper end of each of the sleeves I', and each of the said rings carries four pairs of upwardly-projecting lugs $i$, in each pair of which lugs is journaled a roller $i'$, as shown in Figs. 5 and 7. Rings similar to I² with their rollers may be mounted upon the lower end of the helices, if desired.

The magnet-cores K are round and of such size as to pass freely through the sleeves I' and between the four rollers $i'$ at the top of the hole, the said rollers being placed at diametrically opposite points around the openings through the sleeves I' and projecting far enough over the said openings to guide the cores K through the sleeves I' and prevent their coming in contact with the sides of the sleeves.

A circular head or disk $k$ is formed upon the upper end of each of the cores K, and when the said cores are in their lowest position these heads rest upon the rollers $i'$.

A standard D² is secured to the center of the yoke-piece D' and projects above the two cores K, the upper end being formed into two arms $d^2$, which extend over the centers of the said cores and terminate in hooks $d^3$. Springs $k'$ are secured at one end to the said hooks $d^3$ and at the other end to the tops of the cores K and serve to hold the said cores in an elevated position.

The lower ends of the cores K are slightly flattened, as at $k^2$, and project into slots or recesses in a shoe K', the said shoe having slotted lugs K², which project upwardly on each side of the flattened ends of the cores and are loosely secured thereto by the pins $k^3$, passing through the ends of the said cores and extending into the slots in the lugs, as shown in Fig. 5. This shoe of diamagnetic material is prolonged and curved upwardly, as at $K^3$, and is intended to ride over any obstacle which might be lying on the track, and thus raise the cores K of the magnets, so as to clear the obstacle and prevent injury to the magnets.

As the magnet approaches one of the armature-boxes the cores pass over one of the iron extensions $g$ and are attracted thereby. This attraction will be sufficient to draw the said cores down until their heads $k$ rest on the rollers $i'$, which will bring their lower ends or poles near enough to attract the armature $H'$ with sufficient force and thus open or close the circuit, as the case may be. As soon as the magnets have passed away from the magnetic influence of the armature-box G the springs $k'$ will raise the cores K to their elevated position as before.

As hereinbefore stated, the magnet on the front end of the car should pass over and attract the end $h'$ of the armature $H'$ to close the circuit to the section of conducting-rail that the current-collecting device on the car is entering at that time, and the magnet on the rear end of the car should pass over and attract the end $h^2$ of the armature to open or break the circuit as the collecting device passes off of that section of the conductor. Thus it will be obvious that should it be desirable to run the car in the opposite direction it would be necessary to shift the magnets so that the magnet which attracted the end $h^2$ of the armature in the former instance would now attract the end $h'$, and vice versa; also, it will be obvious that the rigidity of the car-truck will cause the ends of the car to project beyond the circumference of a curve in the track, and that if these magnets be placed near the ends of the car they would be projected beyond the proper position for operating the armature $H'$.

In order to shift the position of the magnets when the motor is reversed, and also to provide means for adjusting the position of the magnets in going around curves, I use the hereinafter-described mechanism.

Since the mechanism is substantially the same at each end of the car, I will describe that at one end in detail and then point out any differences between the two ends.

The link L is connected to the magnet-carriage D by means of the ear $d^4$, and this link is pivotally connected to the long arm of the lever $L'$, pivoted on a pin $L^2$, secured to one of the channel-irons $C^2$. The short arm of the lever $L'$ is connected by the link M to the downwardly-projecting arm $n^2$ of the bent lever N. This bent lever N, as shown in Fig. 13, is formed with a straight back $n$, bent at right angles at each end, as at $n'$ and $n^3$, the part $n'$ being bent downwardly, as at $n^2$, and the arm $n^3$ terminating in a round end $n^4$, for a purpose to be hereinafter explained. The arms $n'$ and $n^3$ are perforated to form journal-bearings for the pin $o$, which is mounted in the upwardly-projecting legs $o'$, carried by the forked lever O, which is pivoted on the pin $L^2$. One of the arms O of this lever is connected by the rod $O^3$ to the arm $O'$ of a similar lever on the opposite end of the truck, which operates in a similar way, and the arm $O^2$ of the lever O is connected by a rod $O^4$ to the mechanism for operating the levers O from the platform of the car, which mechanism will now be described.

P designates one of the boxes containing the switches for starting, stopping, and reversing the motors of the car, one of which boxes is placed on each platform of the car. These boxes contain in one side the usual starting and stopping devices, operated by the handle $p$, and which are well known in the art, and therefore need no further description. In the other side of the box is journaled a tubular shaft $P'$, having at its upper end a handle $p'$, provided with a spring-actuated locking-pawl $p^2$, adapted to engage in either of the two notches 1 or 2 of the notched segment $P^2$ on the top of the box P. This tubular shaft $P'$ carries within the box a toothed segment $p^3$, meshing in the segment $P^3$, which operates the usual reversing devices $P^4$, which may be any of the well-known reversing-switches in general use, and therefore need not be further described herein.

The lower end of the tubular shaft $P'$ carries a crank-arm $p^4$, to which is connected the end of the rod $O^4$, for operating the levers O.

It will be seen that by turning the handle $p'$ from the notch 1 to the notch 2 of the segment $P^2$, or vice versa, the tubular shaft will cause the segments $p^3$ and $P^3$ to reverse the direction of the motor, and at the same time will turn the crank-arm $p^4$, which through the connecting-rods $O^4$ and $O^3$ will turn the forked levers O at each end of the car. These forked levers O being connected by the levers N and links M to the levers $L'$, and the levers N being held from movement about their fulcrum-pins $o$, by means to be hereinafter described, the levers $L'$ will be moved about their fulcrum-pins $L^2$ and by means of the link L will move the magnets so as to change their positions with relation to the ends of the armatures placed along the track. Thus if the forward magnet had been in position to attract the end $h'$ of the armature $H'$ and the rear magnet in position to attract the end $h^2$ of the armature the movement of the handle $p'$ would bring the forward magnet in position to attract the end $h^2$ of the armature and the rear magnet in position to attract the end $h'$ of the armature, at the same time reversing the direction of the motor to run the car backward.

Extending through the tubular spindle $P'$ is a spindle $P^5$, having at its upper end a handle $p^5$, provided with a spring-actuated locking-pawl $p^6$, adapted to engage in either of the notches 3, 4, or 5 in the segment $P^2$ and provided at its lower end with a crank-arm $p^7$.

In suitable supports $C^3$ and $C^4$ on each end of the car-truck are journaled rock-shafts Q and Q', each having a horizontal arm $q$ and the rock-shaft Q having the downwardly-projecting arms $q'$ and $q^2$. The rock-shaft Q' is provided with a downwardly-projecting arm $q^3$, from which a rod $Q^2$ extends to the arm $q^2$ on the rock-shaft Q at the other end of the car, thus causing the two rock-shafts to rotate together. A rod $Q^3$ is connected to the arm $q'$ of the rock-shaft Q and to the crank-arm $p^7$ of the spindle $P^5$.

The horizontal arms $q$ of the rock-shafts are slotted, as at $q^4$, to receive the round ends $n^4$ of the bent levers N, and when these horizontal arms $q$ are held rigidly in a horizontal position the bent lever N will be prevented from turning about its fulcrum-pin $o$ and the link M will form an unyielding connection between the levers O and L', so that these two levers will move together about the fulcrum-pin $L^2$ as one lever or be held rigid when the handle $p'$ of the tubular spindle P' is locked in either of its positions.

The spindle $P^5$ through its crank-arm $p^7$ and the rod $Q^3$ controls the movement of the rock-shafts Q and Q', and when its handle $p^5$ is locked in its central position in the notch 4 of the segment $P^2$ the arms $q'$ of the rock-shafts Q and Q' will be held in a horizontal position, which will hold the magnets in the proper position for traveling in either direction on a straight track. When the car approaches a curve, the motorman will notice when the forward magnets have passed over the first armature-box in the curve, and when they are safely over will move the handle $p^5$ of the spindle $P^5$ to the notch 5 on the right, if the curve be to the right, or to the notch 3 on the left, if the curve be that way, (the handle always being moved in the same direction as the curve.)

From the foregoing it will be seen that when the handle $p^5$ is moved to the right or left the rock-shafts Q and Q' will be oscillated and move the arms $q$ up or down, as the case may be. Thus when the handle $p^5$ is moved to the right the arms $q$ will be moved upwardly and will rock the bent levers N, causing their arms $n^3$ to rise and their downwardly-projecting arms $n^2$ to push the links M and turn the levers L' about their pivot-pins $L^2$ and draw both of the magnets in toward the middle of the track, and when the handle $p^5$ is turned to the left the several parts will move in the opposite directions and move the magnets away from the center of the track. After the forward magnets have passed over the last armature-box in the curve the motorman will move the handle $p^5$ back to the center notch 4, which will place the magnets in position for the car to run on the straight track.

The boxes P are placed one on each platform on opposite sides of the car—i. e., so that they will be on the right-hand side of the motorman at either end of the car. In order to get a straight pull on the arm $q^3$ of the rock-shaft Q', a bell-crank lever $Q^5$ (see Fig. 1) is mounted on a support, as $C^8$, extending from the magnet-frame C and connected by a rod $Q^6$ with the arm $q^3$ and by a rod $Q^7$ with the crank-arm $p^7$ at that end of the car.

The segment $P^2$ is provided with teeth $p^8$, which extend beyond its circumference far enough to limit the movement of the handles $p'$ and $p^5$ and prevent them from being turned far enough to interfere with each other.

On elevated railways I may dispense with the spindle $P^5$ and use a simple spindle in place of the tubular spindle P' for the reversing movements, and for adjusting the magnets on curves use the devices shown in Figs. 17 to 22.

On the magnet-frame of the car-truck between the magnets and the center of the car are mounted two brackets $C^5$ and $C^7$, one of which has a disk $C^6$ secured thereto, to the center of which is pivoted, as at $r$, a downwardly-projecting lever R, the lower end of which is bent at right angles, as at R', and then bent around upon itself at its extremity, as at $r'$. A little below the center of the lever R is formed a lug $R^2$, extending above and parallel to the bent portion R', and to this lug $R^2$ is fulcrumed, as at $t$, a four-arm lever T, having the straight upwardly-projecting arm T', the central lower curved arm $T^2$, and the front and rear curved arms $T^3$ and $T^4$.

The disk $C^6$ is provided with stop-lugs $c^3$, $c^4$, and $c^5$ and with shoulders $c^6$ and $c^7$, and when the two levers R and T are hanging in their central perpendicular position a roller $t'$ on the end of the lever-arm T will rest between the two stop-lugs $c^3$ and $c^4$ and thus prevent the lever R from being swung in either direction. The lower central arm $T^2$ of the lever T passes beneath the bent-over extremity $r'$ of the lever R and is allowed a limited movement between the bent-around end of the said lever and a stop-lug $r^2$ on said lever R, and the said lever T is held with its roller $t$ in engagement with the stop-lugs $c^3$ and $c^4$ by means of a spring $s$, which is attached at its lower end to the bent-around part $r'$ of the lever R and at its upper end to a yoke S, hung on two pins $t^5$, secured to the lever T, one on each side of its fulcrum-point $t$, as shown in Fig. 18, from inspection of which figure it will be seen that when the lever T is in its central position relative to the lever R (at which time the roller $t'$ is in engagement with the lugs $c^3$ and $c^4$) the spring $s$ will press the yoke S equally upon the two pins $t^5$, thus tending to hold the lever T in this position, but when the lever is swung about its fulcrum-point one or the other of the pins $t^5$ will be raised, causing the yoke S to pull harder on that pin, tending to pull the lever T back to its central position with relation to the lever R.

The lower arms $T^2$, $T^3$, and $T^4$ of the lever T are each provided with a roller $t^2$, $t^3$, and $t^4$, respectively, which rollers are arranged in proper position to come in contact with a short post U, projecting upwardly from one of the supports of the elevated railway, at the proper point to engage one of the rollers on the lever T just after the forward magnet has passed over the first armature-box at the beginning of a curve, as shown in Fig. 22.

The arms $T^2$, $T^3$, and $T^4$ of the lever T are made of such a length that an arc of a circle, as Z Z, struck from the fulcrum-point $r$ of the lever R will pass through the centers of the rollers $t^2$, $t^3$, and $t^4$.

To the bracket $C^7$ is pivoted, as at $v$, a four-arm lever V, having the upwardly-projecting arm V′, the downwardly-projecting arm $V^2$, and the inclined side arms $V^3$ and $V^4$. Each of the three latter arms has a roller $v^2$, $v^3$, and $v^4$, respectively, arranged with the centers of said rollers in the arc of a circle $z'$, struck from the fulcrum-point $v$ of the lever V.

A rod W is pivoted to the end of the upper arm V′ of the lever V and at its other end to a stud $t^6$ on the lever T, just below the fulcrum-point $t$ of the latter, and as the lever R is connected to the downwardly-projecting arm $q^2$ of the rock-shaft Q by the rod W′ and to the downwardly-projecting arm $q^3$ of the rock-shaft Q′ by a rod $W^2$, the arm $q^7$ of the rock-shaft Q may be dispensed with.

The mechanism for shifting the magnets when reversing the car is precisely the same as in the first instance, but the rock-shafts Q and Q′, which control the movements of the magnet when the car passes around a curve, instead of being operated by hand, are automatically operated in the following manner: When the car is traveling upon a straight track, the levers R, T, and V will hang in a perpendicular position, with the central rollers $t^2$ and $v^2$ in the lowest position, as shown in Fig. 17, the three levers being locked in this position by reason of the roller $t'$ being between the stop-lugs $c^3$ and $c^4$. When the car approaches a curve, the roller $t^2$ will come in contact with the post U, which is made of such a height as to strike only the lowest roller $t^2$, passing freely under the other roller $t^3$. The first result of this contact will be to turn the lever T to the position shown in heavy dotted lines in Fig. 18, thus bringing the roller $t'$ out from between the lugs $c^3$ and $c^4$, unlocking the levers, and allowing them to turn to the position shown in fine dotted lines in the same figure. At this time the roller $t^2$ will pass over the post U and the spring $s$ will pull the lever T back to its central position relative to the lever R and throw the roller $t'$ under the stop-lug $c^4$, thus locking the parts in this last position. This movement will, through the rod W, turn the lever V so that its roller $v^4$ will take the lowest position, and this lever V being set out of line with the levers R and T, as shown in Fig. 22, will not strike the post U.

It will be understood that the movement of the levers just described will, through the rods W′ and $W^2$, turn the rock-shafts Q and Q′, raise the bent levers N, and so draw the magnets toward the center line of the track in the proper position to attract the armatures as the car goes around a curve to the right.

The movement of the levers R and T is limited by the lug $c^5$ and the shoulders $c^6$ and $c^7$ on the disk $C^6$, so that they may not be thrown too far should the rollers strike the posts when the car is going at considerable speed.

A post U′ is placed near the end of the curve in proper position to strike the lowest roller of the lever V, which in this instance is the roller $v^4$. The first effect of this contact will be to push on the rod W and turn the lever T about its fulcrum-point to throw the roller $t'$ inwardly from beneath the stop-lug $c^4$, and the continued movement of this lever V will push the levers R and T back to their normal position, where they will be locked by the roller $t'$ passing between the stop-lugs $c^3$ and $c^4$. This return movement of the levers R, T, and V will of course return the magnets to their normal position for traveling on a straight track.

Should the car be reversed and come back around the curve, (the levers being in their perpendicular position,) the lowest roller $v^2$ of the lever V will strike the post U′ just as the car enters the curve and, causing the rod W to pull upon the lever T, will move the latter first to bring the roller $t'$ out from between the stop-lugs $c^3$ and $c^4$ and then to move the levers R and T to the position shown in fine-dotted lines in Fig. 18. This will bring the magnets into the proper position to attract the armatures as the car passes around the curve. As the car leaves the curve the roller $t^3$ (that being the lowest at this time) will strike the post U, throwing the roller $t'$ inward from under the stop-lug $c^4$, and then returning the several parts to their normal positions.

In rounding a curve to the left the post at the entrance to the curve will be placed in position to strike the lowest roller on the lever V. This will cause the rod W to turn the lever T and throw its roller $t'$ inwardly from between the stop-lugs $c^3$ and $c^4$ and then throw both the levers R and T forward until the roller $t'$ drops over the stop-lug $c^3$, thus holding the levers in their forward position. This movement of the levers will place the magnets in the proper position for pressing around a curve to the left. As the car leaves the curve the post at the end of the curve, which is placed in position to strike the lowest roller of the lever T, will throw the several parts back to their normal positions for running on a straight track. Should the car be reversed after passing around a curve to the left and come back around the curve, the rollers on the lever T will be acted upon at the entrance to the curve, and the rollers on the lever V will be acted upon as the car leaves the curve. This will give the magnets the proper adjustment for rounding the curve back again, as will be readily understood from an inspection of Figs. 17 and 18.

The collecting-shoe X is placed beneath the central part of the car in the proper position to slide on the interrupted conducting-rail E and makes continuous electrical contact therewith, or the interrupted conducting-rail may be replaced by a number of insulated conducting-posts Y, placed at suitable intervals along the track, as shown in Fig. 23. These conducting-posts project a short distance above the street-surface and are placed opposite each armature-box.

The conducting-shoe X is formed in three or more parts, three being shown in the present instance. The central part or section X' is secured to the vertical supporting-rods $x$, which extend upwardly through perforations in a frame $C^0$, which is bolted to two of the channel-irons $C^2$ and extends longitudinally below the middle of the frame C. The rods $x$ are prevented from dropping out by the pins $x^{00}$, and the shoe X is held in contact with the conductors in the track by the springs $x^0$. (See Fig. 25.) The two end sections $X^2$ and $X^3$ are pivoted to the ends of the central section, as at the points $x'$, the whole being mounted flexibly in a vertical direction, as described above.

Each of the sections $X^2$ and $X^3$ are provided, near their pivotal points, with laterally-extending arms $x^2$ and $x^3$, respectively, the arm $x^2$ extending toward the right side of the car and the arm $x^3$ extending toward the left of the car, and these two arms are connected together by a rod $x^4$, pivoted to their ends. One of the arms, as $x^3$, is connected by a rod $X^5$ (see Fig. 1) with the downwardly-projecting arm $q'$ of the rock-shaft Q, and when the latter is turned to cause the magnet to take the proper position for passing around a curve the end sections $X^2$ and $X^3$ of the collecting-shoe will be turned upon their pivots to conform to the curve in the conductor, as will be readily understood.

The rod $X^5$ is formed in two parts or sections, connected together by an insulating piece $x^5$ to prevent the current from being carried to the truck of the car.

Having thus described my invention, what I claim, and desire to secure by Letters Patent of the United States, is—

1. In an electric railway, the combination with the truck, of a magnet-frame provided with grooved tracks at each end thereof mounted independently of said truck, magnets suspended from rollers traveling in said grooved tracks with means for moving said magnets laterally, and means operated by said magnets for completing the electric circuit through the motor on the car, substantially as described.

2. In an electric railway, the combination with the truck, of a magnet-frame provided with tracks at each end thereof mounted independent of said truck, magnets suspended from rollers traveling on said tracks, with means for moving said magnets laterally, and means operated by said magnets for completing the electric circuit through the motor on the car, substantially as described.

3. In an electric railway, the combination with the truck, of a magnet-frame provided with grooved tracks at each end thereof mounted independent of said truck, magnet-carriages mounted on rollers traveling in said grooved tracks, magnets mounted on said carriages, with means for moving said magnet-carriages laterally, and means operated by said magnets for completing the electric circuit through the motor on the car, substantially as described.

4. In an electric railway, the combination with the truck, of a magnet-frame provided with tracks at each end thereof mounted independent of said truck, wheeled magnet-carriages mounted on said tracks, with means for moving said magnet-carriages laterally, and means operated by said magnets for completing the electric circuit through the motor on the car, substantially as described.

5. A current-collecting shoe for use on electric railways comprising a central portion yieldingly connected to the truck, and end portions pivotally connected to said central portion, and provided with lateral arms oppositely disposed, a bar connecting said arms, and means for moving said bar and thus swinging said end portions laterally about their pivots, substantially as described.

6. In an electric railway, the combination with the car-truck and frame mounted thereon and laterally-movable magnets carried by said frame, of a collecting-shoe composed of a plurality of parts pivoted together also carried by said truck, means for shifting said magnets laterally, and for swinging parts of said shoe in the same direction that the magnets are moved, and means operated by said magnets and said shoe for completing the electric circuit through the motor on the car, substantially as described.

7. In an electric railway, the combination with the car-truck and frame mounted thereon and laterally-movable magnets carried by said frame, of a collecting-shoe composed of a plurality of parts pivoted together also carried by said truck, means operated by hand for simultaneously shifting said magnets laterally, and for swinging parts of said shoe in the same direction that the magnets are moved, and means operated by said magnets and said shoe for completing the electric circuit through the motor on the car, substantially as described.

8. In an electric railway, the combination with the car-truck and frame mounted thereon and laterally-movable magnets carried by said frame, of a long collecting-shoe placed near the longitudinal center of the car and composed of a plurality of parts pivoted together with arms oppositely disposed on the pivoted end pieces, and a bar connecting said arms, means operated by hand for simultaneously shifting said magnets laterally, and for swinging the end pieces of said shoe in the same direction that the magnets are moved, and means operated by said magnets and said shoe for completing the electric circuit through the motor on the car, substantially as described.

9. In an electric railway, the combination with the car-truck and frame mounted thereon and laterally-movable magnets carried by said frame, of a long collecting-shoe placed near the longitudinal center of the car and composed of a plurality of parts pivoted together with arms oppositely disposed on the pivoted end pieces, a rigid bar connecting said arms, and a hand-crank and system of levers for simultaneously shifting said magnets laterally, and for swinging parts of said shoe in the same direction that the magnets are moved, and means operated by said magnets and said shoe for completing the electric circuit through the motor on the car, substantially as described.

10. In an electromagnet for use on electric-railway cars, the combination with a movable core, and means for returning the said core to the normal position, of a shoe made of diamagnetic material connected to the end of said core, substantially as described.

11. In an electromagnet for use on electric-railway cars, the combination with a movable core, and means for returning the said core to the normal position, of a diamagnetic shoe curved at both ends and connected to the end of said core, substantially as described.

12. In an electromagnet for use on railway-cars, the combination with a vertically-movable core, and a spring normally supporting the weight of said core and the parts connected thereto, of a shoe made of diamagnetic material suspended from the end of said core, substantially as described.

13. In an electromagnet for use on railway-cars, the combination with a vertically-movable core, and a spring normally supporting the weight of said core and the parts connected thereto, of a shoe made of diamagnetic material and having the ends curved upward suspended from the end of said core, substantially as described.

14. In an electromagnet for use on electric-railway cars, the combination with a movable core, guides for said core, and a spring for returning the said core to the normal position, of a shoe made of diamagnetic material loosely connected to the end of said core, substantially as described.

15. In an electromagnet for use on electric-railway cars, the combination with a movable core, guides for said core, and a spring for returning the said core to the normal position, of a diamagnetic shoe curved at both ends and loosely connected to the end of said core, substantially as described.

16. In an electromagnet for use on railway-cars, the combination with a vertically-movable core, rollers for guiding said core, and a spring normally supporting the weight of said core and the parts connected thereto, of a shoe made of diamagnetic material suspended from the end of said core, substantially as described.

17. In an electromagnet for use on railway-cars, the combination with a vertically-movable core, rollers for guiding said core, and a spring normally supporting the weight of said core and the parts connected thereto, of a shoe made of diamagnetic material and having the ends curved upward suspended from the end of said core, substantially as described.

18. In an electric-railway system of the character described, the combination with a laterally-movable magnet-carriage, and a magnet carried thereby, of a movable core, means for returning the said core to the normal position, and a shoe made of diamagnetic material connected to the end of said core, substantially as described.

19. In an electric-railway system of the character described, the combination with a laterally-movable magnet-carriage, and a magnet carried thereby, of a movable core, means for returning the said core to the normal position, and a diamagnetic shoe curved at both ends and connected to the end of said core, substantially as described.

20. In an electric-railway system of the character described, the combination with a laterally-movable magnet-carriage, and a magnet carried thereby, a vertically-movable core, and a spring carried by said carriage and normally supporting the weight of said core and the parts connected thereto, of a shoe made of diamagnetic material suspended from the end of said core, substantially as described.

21. In an electric-railway system of the character described, the combination with a laterally-movable magnet-carriage, and a magnet carried thereby, a vertically-movable core, and a spring normally supporting the weight of said core and the parts connected thereto, of a shoe made of diamagnetic material and having the ends curved upward suspended from the end of said core, substantially as described.

22. In an electromagnet for use on electric-railway cars, the combination with a plurality of movable core-pieces, guides for said core-pieces, and springs for returning the said core-pieces to the normal position, of a shoe made of diamagnetic material loosely connected to the end of each of said core-pieces, substantially as described.

23. In an electromagnet for use on electric-railway cars, the combination with a plurality of movable core-pieces, guides for said core-pieces, and springs for returning the said core-pieces to the normal position, of a diamagnetic shoe curved at both ends and loosely connected to the end of each of said core-pieces, substantially as described.

24. In an electromagnet for use on railway-cars, the combination with a plurality of vertically-movable core-pieces, rollers for guiding said core-pieces, and springs normally supporting the weight of said core-pieces and the parts connected thereto, of a shoe made of diamagnetic material suspended from the end of each of said core-pieces, substantially as described.

25. In an electromagnet for use on railway-cars, the combination with a plurality of vertically-movable core-pieces, rollers for guiding said core-pieces, and springs normally supporting the weight of said core-pieces and the parts connected thereto, of a shoe made of diamagnetic material and having the ends curved upward, suspended from the end of each of said core-pieces, substantially as described.

26. In an electric-railway system of the character described, the combination with a laterally-movable magnet-carriage, and a magnet carried thereby, of a plurality of movable core-pieces, means for returning the said core-pieces to the normal position, and a shoe made of diamagnetic material connected to the end of each of said core-pieces, substantially as described.

27. In an electric-railway system of the character described, the combination with a laterally-movable magnet-carriage, and a magnet carried thereby, of a plurality of movable core-pieces, means for returning the said core-pieces to the normal position, and a diamagnetic shoe curved at both ends and connected to the end of each of said core-pieces, substantially as described.

28. In an electric-railway system of the character described, the combination with a laterally-movable magnet-carriage, and a magnet carried thereby, a plurality of vertically-movable core-pieces, and springs carried by said carriage and normally supporting the weight of said core-pieces and the parts connected thereto, of a shoe made of diamagnetic material suspended from the end of said core-pieces, substantially as described.

29. In an electric-railway system of the character described, the combination with a laterally-movable magnet-carriage, and a magnet carried thereby, a plurality of vertically-movable core-pieces, and springs normally supporting the weight of said core-pieces and the parts connected thereto, of a shoe made of diamagnetic material and having the ends curved upward suspended from the end of said core-pieces, substantially as described.

30. In an electric-railway system of the character described, the combination with a truck and a truck mounted thereon and a laterally-movable magnet-carriage carried by said truck, and a magnet carried by said carriage, of a movable core, means for returning the said core to the normal position, a shoe made of diamagnetic material connected to the end of said core, a pivoted armature mounted near the track and adapted to be controlled by said magnet, and magnetic material placed on either side of said armature to attract said core, substantially as described.

31. In an electric-railway system of the character described, the combination with a truck and a truck mounted thereon and a laterally-movable magnet-carriage mounted on said frame, and a magnet carried by said carriage, of a longitudinally-movable core, means for returning the said core to the normal position, a diamagnetic shoe curved at both ends and connected to the end of said core, a pivoted armature mounted near the track and adapted to be controlled by said magnet, and magnetic material placed on either side of said armature to attract said core, substantially as described.

32. In an electric-railway system of the character described, the combination with a truck and a truck mounted thereon and a laterally-movable magnet-carriage mounted on said frame, and a magnet carried by said carriage, a vertically-movable core, and a spring carried by said carriage and normally supporting the weight of said core and the parts connected thereto, a shoe made of diamagnetic material suspended from the end of said core, a pivoted armature mounted near the track and adapted to be controlled by said magnet, a box inclosing said armature, and arms of magnetic material extending longitudinally from said box, substantially as described.

33. In an electric-railway system of the character described, the combination with a truck and a truck mounted thereon and a laterally-movable magnet-carriage carried by said frame, and a magnet mounted in said carriage, a vertically-movable core, and a spring normally supporting the weight of said core and the parts connected thereto, of a shoe made of diamagnetic material and having the end curved upward suspended from the end of said core, a pivoted armature mounted near the track and adapted to be controlled by said magnet, a box inclosing said armature, and arms of magnetic material extending longitudinally from said box, substantially as described.

34. In an electric-railway system of the character described, a pivoted armature, a box containing the said armature and arms of magnetic material projecting from said box, substantially as described.

35. In an electric-railway system of the character described, the combination with a magnet carried by the car and provided with a movable core, of a pivoted armature adapted to be controlled by said movable core, and masses of magnetic material placed in the line of travel of said magnet to draw down said core and thus bring it in closer proximity to said armature, substantially as described.

36. In an electric-railway system of the character described the combination with a magnet carried by the car and provided with a movable core, of a pivoted armature adapted to be controlled by said movable core, a box inclosing said armature and arms of magnetic material integral with or attached to said box and placed in the line of travel of said magnet, to draw down said core and thus bring it in closer proximity to said armature, substantially as described.

In testimony whereof I affix my signature in presence of two witnesses.

JOHN W. DARLEY, JR.

Witnesses:
JOS. H. BLACKWOOD,
JOHN CHALMERS WILSON.